United States Patent
Mackenzie et al.

(10) Patent No.: US 11,221,266 B2
(45) Date of Patent: Jan. 11, 2022

(54) AUTOMATIC ZERO RESET FOR A PRESSURE TRANSDUCER

(71) Applicant: Baker Hughes Oilfield Operations LLC, Houston, TX (US)

(72) Inventors: Colin James Mackenzie, Houston, TX (US); Thomas John Piggin, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 85 days.

(21) Appl. No.: 16/850,805

(22) Filed: Apr. 16, 2020

(65) Prior Publication Data

US 2020/0370980 A1 Nov. 26, 2020

Related U.S. Application Data (60) Provisional application No. 62/851,380, filed on May 22, 2019.

(51) Int. Cl.
*G01L 27/00* (2006.01)
*G01L 9/00* (2006.01)

(52) U.S. Cl.
CPC ............ *G01L 9/0022* (2013.01); *G01L 27/00* (2013.01); *G01L 27/002* (2013.01); *G01L 27/005* (2013.01); *G01L 9/0091* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................... 73/700–756
See application file for complete search history.

(56) References Cited

U.S. PATENT DOCUMENTS

| | | | |
|---|---|---|---|
| 4,886,070 A * | 12/1989 | Demarest | ........... A61B 5/02156 600/488 |
| 5,402,666 A * | 4/1995 | Chaipin | .............. G01L 19/0015 73/1.59 |
| 6,584,864 B2 | 7/2003 | Greenwood | |
| 7,017,418 B1 | 3/2006 | Thakre et al. | |
| 8,863,579 B2 | 10/2014 | Kinnell | |
| 9,784,630 B2 | 10/2017 | Kinnell et al. | |
| 9,998,089 B2 | 6/2018 | Craddock et al. | |

(Continued)

FOREIGN PATENT DOCUMENTS

CN 106092439 A * 11/2016

*Primary Examiner* — Andre J Allen
(74) *Attorney, Agent, or Firm* — Mintz Levin Cohn Ferris Glovsky and Popeo, PC; Lisa Adams (57) ABSTRACT

Systems, methods, and computer readable medium are provided for automatically resetting a zero-offset calibration coefficient for a pressure transducer. Ambient pressure measurements from a first pressure sensor and a second pressure sensor can be received by a computing device and compared. Based on determining a difference in the received ambient pressure measurements, an updated zero-offset calibration coefficient can be generated. The updated zero-offset calibration coefficient can be transmitted to the first pressure sensor, which once received, causes the first pressure sensor to update a previously determined zero-offset calibration coefficient with the updated zero-offset calibration coefficient.

20 Claims, 3 Drawing Sheets

(56) References Cited

U.S. PATENT DOCUMENTS

| | | | |
|---|---|---|---|
| 2006/0272383 A1* | 12/2006 | Huang | G01L 25/00 |
| | | | 73/1.15 |
| 2011/0040206 A1* | 2/2011 | Burger | G01L 27/002 |
| | | | 600/561 |
| 2014/0298884 A1* | 10/2014 | Mindlin | G01L 27/00 |
| | | | 73/1.63 |
| 2016/0231192 A1* | 8/2016 | Hammerschmidt | G01L 9/0072 |
| 2019/0033342 A1* | 1/2019 | Thompson | G01L 27/002 |

* cited by examiner

Figure 3

AUTOMATIC ZERO RESET FOR A PRESSURE TRANSDUCER

RELATED APPLICATION

This application claims priority under 35 U.S.C. § 119(e) to U.S. Provisional Application No. 62/851,380, filed May 22, 2019, the entire contents of which are hereby expressly incorporated by reference herein.

BACKGROUND

Pressure sensors or transducers are used in a variety of applications to measure a pressure of a gas or liquid. Pressure sensors commonly generate an electrical signal corresponding to the pressure imposed on the sensor by the gas or liquid. The generated electrical signal, corresponding to a pressure measurement of the pressure or liquid, can be determined based on calibration coefficients, which have been previously determined at a wide variety of pressures and temperatures and programmed into the sensor during manufacture by the sensor manufacturer. Over time, the sensor may experience a condition in which pressure measurements become inaccurate due to a drift or recurrent change in measurements of ambient pressures. The drift can be due to mechanical degradations of the sensor materials and/or electrical changes in the sensor components, such as surface charge effects, which can worsen over time. Such progressive changes in a sensor's measurement of ambient pressures, often called zero-drift, can introduce errors into pressure measurements determined by the sensor because the ambient pressure value (e.g., the "zero" value) from which the measured pressure value will be determined, can change or drift over time and no longer reflects a true, accurate value of the ambient pressure.

SUMMARY

In one aspect, methods are provided. In one embodiment, the method can include receiving, by a computing device including a processor, a first ambient pressure measurement from a first pressure sensor. The first ambient pressure measurement determined based on a zero-offset calibration coefficient previously determined for the first pressure sensor. The method can also include receiving, by the computing device, a second ambient pressure measurement from a second pressure sensor. The method can further include determining, by the computing device, a difference between the first ambient pressure measurement and the second ambient pressure measurement. The method can include generating, by the computing device, an updated zero-offset calibration coefficient. The generating responsive to determining the difference between the first ambient pressure measurement and the second ambient pressure measurement. The method can further include transmitting, by the computing device, the updated zero-offset calibration coefficient to the first pressure sensor. The method also includes, upon receiving the updated zero-offset calibration coefficient, causing the first pressure sensor to update the previously determined zero-offset calibration coefficient with the updated zero-offset calibration coefficient.

Non-transitory computer program products (i.e., physically embodied computer program products) are also described that store instructions, which when executed by one or more data processors of one or more computing systems, causes at least one data processor to perform operations described herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Ambient pressure is a measurement of an amount of pressure exerted on an object by a medium, such as a gas or liquid, which is surrounding the object. Zero-drift can occur when the ambient pressure measurement of a pressure sensor changes over time and no longer accurately reflects a "zero" pressure measurement. Zero-drift can cause pressure measurement errors under non-ambient conditions, such as when pressure measurements associated with a combustion chamber of a turbine engine are being collected, which can lead to inaccurate measurement data and hazardous conditions in safety-critical systems. Zero-drift is a common issue for pressure transducers and other types of sensors. Over time an ambient, zero value may initially change 0.1% annually and can become progressively worse over time. The drift can be due to mechanical degradations of the sensor materials or material properties, such as stretching or compressing the resonating structure of the sensor, as well as changes in the mechanical linkages present within the sensor. Drift can also be attributed to electrical changes which may occur in the sensor, such as surface charge effects, which can worsen over time. Designers of pressure sensor systems commonly account for the expected zero-drift when designing error budget calculations for a particular pressure sensor or sensor system, particularly if a highly accurate pressure measurement is required, as may be the case in a safety or mission critical system.

Zero-drift or zero off-set drift can be corrected by resetting or re-zeroing the sensor, which can be manually time-consuming and can require specialized equipment, such as a potentiometer. In situations where sensors are not networked together, each sensor must be reset individually, which can require significant amounts of time for a system deploying a large number of pressure sensors. In addition, reset procedures for most sensors involve manual adjustments, which are not based on true ambient pressure measurements. As a result, known reset procedures may fail to accurately correct a zero-offset calibration coefficient necessary to provide consistent and accurate ambient pressure measurements throughout a sensor's operational lifetime.

To improve the accuracy and consistency of pressure measurements collected from a machinery or machinery component via one or more sensors, an improved sensor reset system is provided and can include a micro-electromechanical resonant pressure transducer. The micro-electromechanical resonant pressure transducer can provide a more accurate reference measurement of ambient pressure conditions that can be used to reset one or more sensors, which can be coupled to the machine or machinery component. Micro-electro-mechanical resonant pressure transducers can have a zero value (or ambient measurement) accuracy that changes less than 0.01% per year and may not degrade over time as compared to other sensors, such as piezo-resistive pressure transducers or sensors. When employed in an improved sensor reset system as an independent verification source of ambient pressure conditions, the micro-electromechanical resonant pressure transducer can determine ambient pressure measurements, which can then be used to update the zero-offset calibration coefficients of other sensors. In this way, the sensors can be made more accurate as a result of updating the sensor's coefficients that are associated with ambient pressure measurements. Some implementations of an improved sensor reset system described herein can update and/or re-zero any connected sensors automatically and without manual intervention or specialized equipment. And some implementations of an improved sensor reset system can provide a sensor system exhibiting greater accuracies of ambient and non-ambient pressure measurements, and can therefore provide better control over the sensors and machinery or machinery components being monitored by the improved sensor system.

Embodiments of systems, devices, and corresponding methods for an improved sensor reset system configured to automatically perform a zero-reset of a pressure transducer are disclosed herein. However, embodiments of the disclosure can be employed for performing zero-rest operations of a pressure transducer in a manual fashion or requiring user input without limit.

Figure 1:
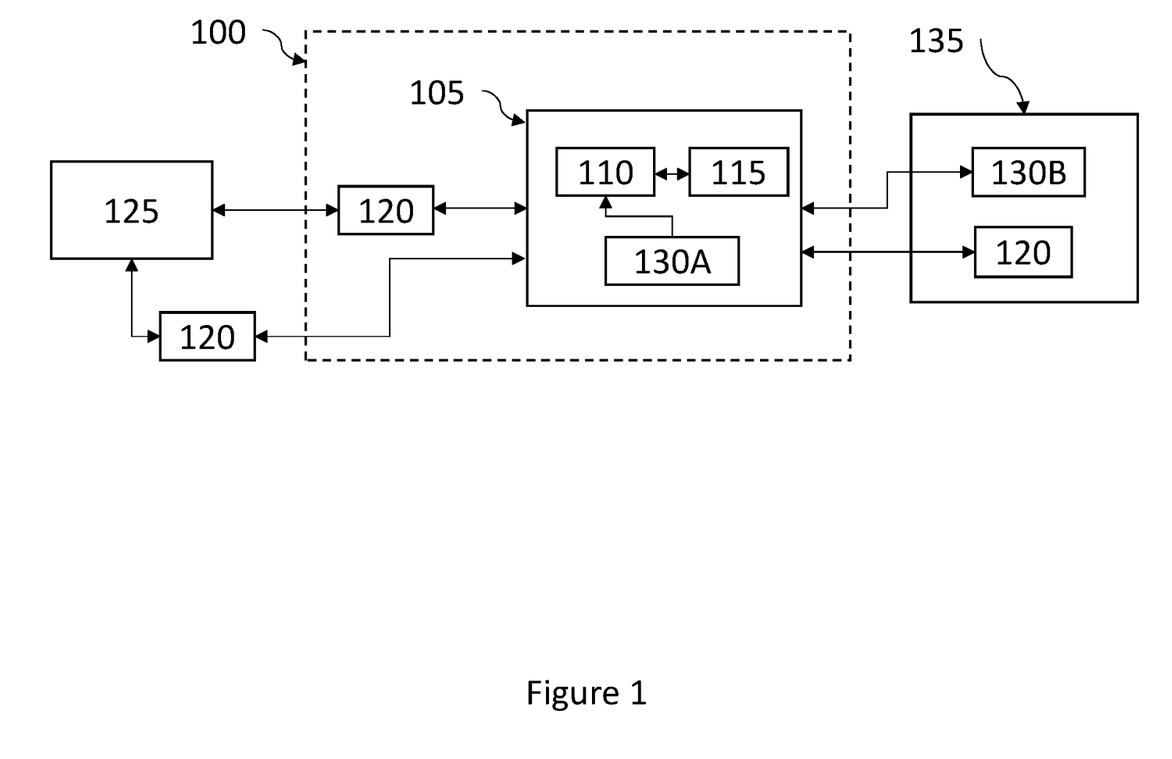
FIG. 1 is a diagram illustrating an exemplary embodiment of a sensor reset system configured to automatically perform a zero-reset of a pressure sensor.

FIG. 1 is a diagram illustrating an exemplary embodiment of a sensor reset system 100 configured to automatically perform a zero-reset of a pressure sensor. The system 100 includes a computing device 105 configured to receive sensor data and process the data to automatically perform a zero-reset operation for one or more connected sensors. The computing device 105 includes a processor 110 and a memory 115. The processor 110 can execute instructions which may be stored in memory 115, to receive sensor data and determine whether to automatically re-zero one or more connected sensors by performing the zero-reset operation. In some embodiments, the memory 115 can store historically determined zero-offset calibration coefficients that have been previously applied by the system 100 to the sensors 120. The historical zero-offset calibration coefficient data can be used for trend analysis of long-term zero-drift conditions.

The system 100 also includes a first sensor, such as sensor 120 coupled to machinery component 125. In some embodiments, one or more sensors 120 can be coupled to machinery component 125 and can collectively referred to as sensors 120. The system 100 also includes one or more second sensors, such as sensors 130A and 130B, collectively referred to as sensors 130. The computing device 105, the processor 110, and the memory 115 of the system 100 can include a computing device, processor, and memory suitable for receiving sensor data from sensors 120 and 130, processing the received sensor data, and transmitting updated sensor configuration data, such as zero-offset calibration coefficients to one or more connected sensors 120. In some embodiments, the sensor 120 can be configured outside of, yet still coupled to, the system 100. In some embodiments, the sensor 120 can be configured within a calibration instrument 135 that is separate from, yet still coupled to, the system 100. In some embodiments, the calibration instrument 135 can be configured within the system 100.

Sensors 120 can include one or more piezo-resistive sensors, which may be coupled to a machinery component. Sensors 120 can be configured to measure and transmit ambient pressure measurements as well as pressure measurements associated with the operation of the machinery component 130. The sensor 120 can incorporate a piezo-resistive pressure-sensing element housed within a custom designed hermetic module and circuitry providing high reliability. The sensor 120 assembly is hermetically sealed and all welds are produced using fusion welding, to result in a rugged and environmentally protected construction. Sensors 120 can each consist of a pressure-sensing element housed within an oil-filled, high integrity glass-to-metal seal module assembly. This assembly can be electron beam welded to a customer specified mounting arrangement to accommodate an applied pressure. Custom electronic circuitry can be soldered to the sensing module to provide a pressure sensor with millivolt (mV) outputs proportional to applied pressure and temperature. The device can be completed by wiring to a specified electrical connector and the fitment of a sealing enclosure. Both of these parts are subsequently fusion welded in position to provide a robust, hermetically sealed device.

One core feature of the sensors 120 includes a miniature silicon sensing diaphragm, into which can be ion implanted a fully active four arm strain gauge bridge. The single crystal silicon diaphragm can be perfectly elastic and can have excellent mechanical and thermal properties including a high degree of linearity, negligible hysteresis, enhanced long-term stability, and high overpressure capability. Different pressure ranges can be achieved by variation of the silicon diaphragm thickness and selection of the optimum diaphragm shape. The use of a low mass, low volume sensing element can not only yields a fast response time but also can result in a rugged device with minimal sensitivity to shock, vibration and acceleration. The resistive elements can be diffused into a silicon slice as individual diaphragms by ion implantation, which can be performed in a well-controlled and regulated process. A complementary thermal device can also embedded during the same processing to provide on-chip temperature measurement if required. Relatively high signal outputs with negligible hysteresis can be example benefits of this technology when compared to bonded foil strain gauge and thin film types of pressure transducers. The high gauge factors, maximizing output voltage relative to strain, can be of particular value in noisy environments where, typically, high accuracies are demanded and a high signal/noise ratio is required, such as aircraft and aerospace applications.

Sensors 120 can include an electronics assembly with an offset resistor, which can ensure all signals are positive for direct input into digital systems. Sensors 120 can also include an electrically erasable programmable read-only memory (EEPROM) to store performance data and/or zero-offset calibration coefficients. In some embodiments, the system 100 can further include a permission-based security mechanism or similar functionality to restrict access to change the zero-offset calibration stored in the EEPROM to one associated with a piezo-resistive pressure transducer, a trench etched resonant pressure sensor, or any superseding sensor technology. The EEPROM can be utilized to digitally correct the performance of the sensors 120. To characterize sensor 120 performance at multiple temperatures over the operating thermal range of a particular application, data can be collected from both the pressure sensing bridge and the adjacent temperature sensor. With this data performance of sensor 120 can be corrected to attain high accuracy. Sensor 120 can be corrected by updating a zero-offset calibration coefficient ($K_{ij}$) for the sensor 120 derived from a polynomial equation (1) shown below, that relates the measured outputs from the sensor 120 (e.g., the pressure output (x in mV) and the temperature output (y in mV) to the applied pressure (P, in pounds per square inch or psi).

$$P = \sum_{i=0}^{2} \sum_{j=0}^{3} K_{ij} \cdot x^i \cdot y^j \quad (1)$$

Thus equation (1) represents a nested, two-dimensional sum of the powers of the input variables (x and y) multiplied by the appropriate coefficient. Expanding the first summation yields equation (2) below.

$$P = \sum_{i=0}^{2} [(K_{i0} \cdot x^i \cdot y^0) + (K_{i1} \cdot x^i \cdot y^1) + (K_{i2} \cdot x^i \cdot y^2) + (K_{i3} \cdot x^i \cdot y^3)] \quad (2)$$

Continuing the expansion yields equation (3) shown below and can be utilized to compute an updated zero-offset calibration coefficient, $K_{00}$.

$$P = [(K_{00} \cdot x^0 \cdot y^0) + (K_{01} \cdot x^0 \cdot y^1) + (K_{02} \cdot x^0 \cdot y^2) + \quad (3)$$
$$(K_{03} \cdot x^0 \cdot y^3)] + [(K_{10} \cdot x^1 \cdot y^0) + (K_{11} \cdot x^1 \cdot y^1) +$$
$$(K_{12} \cdot x^1 \cdot y^2) + (K_{13} \cdot x^1 \cdot y^3)] + [(K_{20} \cdot x^2 \cdot y^0) +$$
$$(K_{21} \cdot x^2 \cdot y^1) + (K_{22} \cdot x^2 \cdot y^2) + (K_{23} \cdot x^2 \cdot y^3)]$$

The zero-offset calibration coefficient (e.g., K00), as well as the other 11 calibration coefficients, can be stored in an internal EEPROM of the sensor 120 as a 32-bit signed floating point number or stored in the memory 115. In this way, the zero-offset calibration coefficient can be overwritten when it has been determined the sensor is experiencing a condition of drift and no longer accurately measuring ambient pressures.

As further shown in FIG. 1, sensor 120 can be coupled to a machinery component 125. The machinery component 125 can include a broad array of machinery or machinery components operating in a wide variety of applications, especially systems containing multiple pressure sensors where the required accuracy of each sensor is important to the overall performance of the sensor system. For example, the machinery component 125 can include a machinery component in an aircraft, such as a gas generator engine control, or a configuration of engine test cells. In some embodiments, the machinery component 125 can include a component from a hydraulic system, such as a hydraulic accumulator. In some embodiments, the machinery component 125 can include a component in a liquid-based, or gas-based pressure system, or a combination thereof.

As also shown in FIG. 1, the sensor reset system 100 also includes one or more sensors 130, such as sensor 130A configured within the computing device 105, and sensor 130B configured outside, yet coupled to, the computing device 105. In this way, the sensor 130B can be incorporated into a separate instrument 135 and used as a calibration aid when needed. Each of the sensors 130 can be configured to measure the same ambient pressure conditions as the sensors 120 deployed in relation to the machinery component 125. Sensors 130 can include a micro-electro-mechanical resonant pressure transducer or sensor, such as a trench etched resonant pressure sensor (TERPS). TERPS can provide a 10× increase in accuracy and long-term stability over other sensor types, which makes them ideal for generating reference ambient pressure measurements, which can further be used in performing zero-reset operations using the system 100 as described herein.

Sensors 130 can be configured to measure pressure measurements from 1 bar to 700 bar in fully oil isolated hermetically sealed housings. Sensors 130 can be optimized for operation in media isolated harsh environment packages. This is accomplished by using low impedance piezo-resistive outputs so the sensor 130 can be operated in a closed loop with reduced influence from parasitic capacitances. Additionally, the resonator geometry of the sensor 130 can be optimized to create a lateral resonator mode that is designed to be fully mechanically balanced and allows for higher resonated quality factors independent of the pressure media or isolation fluid used therein. The sensor 130 die can be hermetically isolated from the pressure media by a metallic isolation diaphragm within a vacuum oil filled chip cavity. The diaphragm structure can be optimized to prevent thermal expansion of the oil creating thermal hysteresis. Additional details of the micro-electro-mechanical resonant pressure transducer configured as sensor 130 in the system 100 described herein are provided in U.S. Pat. Nos. 6,584,864; 8,863,579; 9,998,089; 9,784,630; and 7,017,418, which are each incorporated by reference in their entirety herein.

Figure 2:
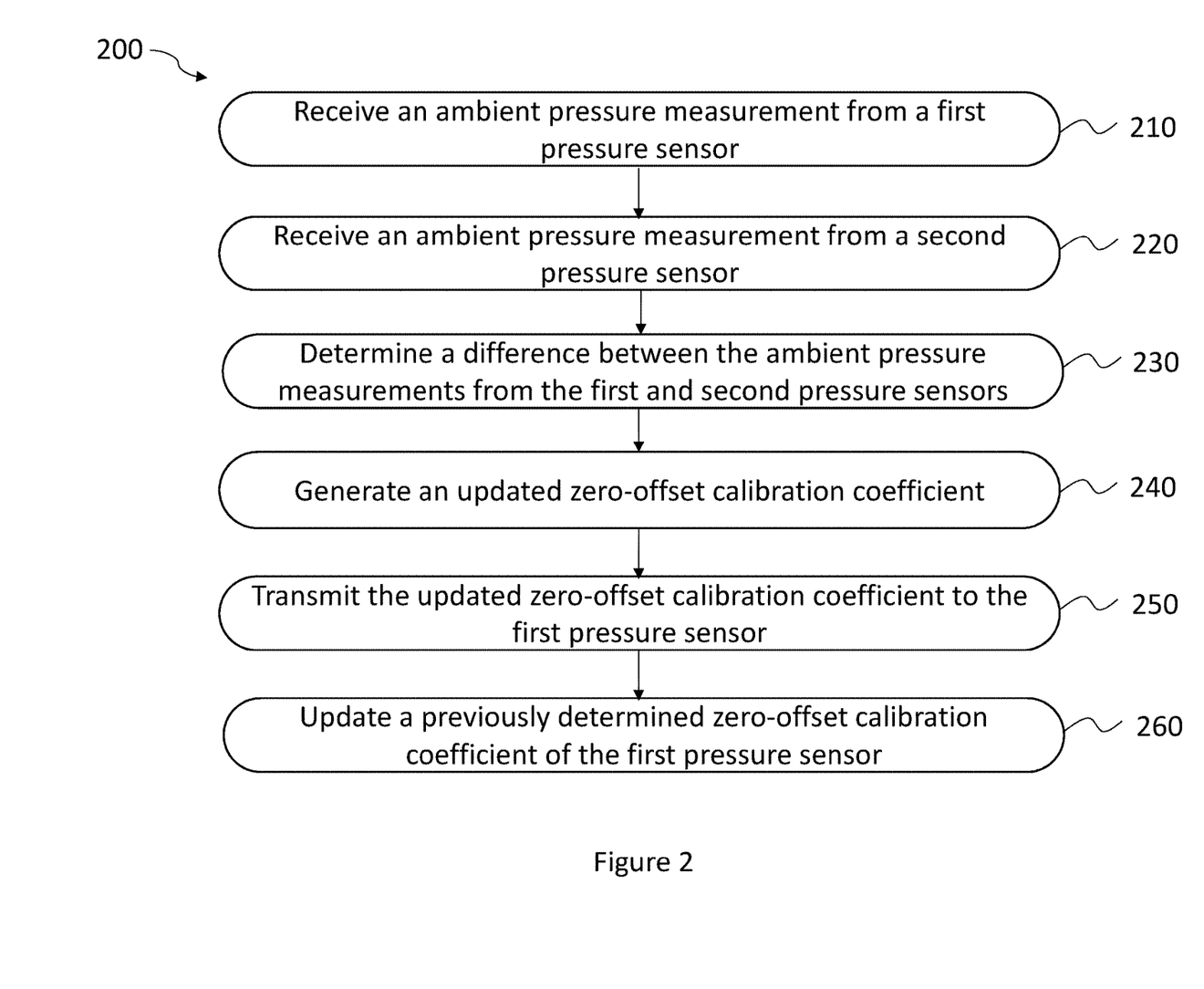
FIG. 2 is a process flow diagram illustrating an example process for automatically performing a zero-reset of a pressure sensor using the sensor reset system of FIG. 1.

FIG. 2 illustrates a flow diagram describing one exemplary embodiment of a method 200 for automatically performing a zero-reset of a pressure sensor using the sensor reset system 100 of FIG. 1 as described herein.

In operation 210, the computing device 105 receives an ambient pressure measurement from a first pressure sensor 120. The sensor 120 can be coupled to the computing device 105 via a wired or wireless connection.

In operation 220, the computing device 105 receives an ambient pressure measurement from a second pressure sensor 130. The second pressure sensor 130 can be a master, high accuracy pressure sensor such as a trench etched resonant pressure sensor. The second pressure sensor 130 can be coupled to the computing device 105 via a wired or wireless connection. In some embodiments, the second pressure sensor 130 can be included within the computing device 105. In other embodiments, the second pressure sensor 130 can be configured separately from the computing device 105, such as in a remotely-deployed independent calibration device 135. Each of the ambient pressure measurements received from the first pressure sensor 120 and the second pressure sensor 130 can be associated with the same ambient conditions.

In operation 230, the computing device 105 determines a difference between the ambient pressure measurements from the first pressure sensor 120 and the second pressure sensor 130. The computing device 105 compares the ambient pressure measurements generated by the first pressure sensor 120 and the second pressure sensor 130 to determine whether a difference in ambient pressure measurements exists between the first pressure sensor 120 and the second pressure sensor 130. For example, the first pressure sensor 120 can be a piezo-resistive pressure sensor and it can determine an ambient pressure measurement to be 1016 mbar. The second pressure sensor 130 can be a micro-electro-mechanical resonant pressure transducer and it can determine an ambient pressure measurement to be 1014 mbar. The computing device 105 can compare these two ambient pressure measurements and determine a 2 mbar drift has occurred for sensor 120 indicating that the sensor 120 is now consistently determining ambient pressure measurements 2 mbar higher than expected or as compared to the ambient measurement reference standard provided by the sensor 130.

In operation 240, the computing device 105 generates an updated zero-offset calibration coefficient. Based on determining a difference in the compared ambient pressure measurements received from the first pressure sensor 120 and the second pressure sensor 130, the computing device generates an updated zero-offset calibration coefficient. In some embodiments, the updated zero-offset calibration coefficient can be generated based on determining a difference in the ambient pressure measurements received from the first pressure sensor 120 and the second pressure sensor 130 exceed a predetermined difference amount. The computing device 105 can generate one or more updated zero-offset calibration coefficients by adding or subtracting a difference amount from the zero-offset (e.g., the $K_{00}$) calibration coefficient for any of sensors 120, which the system 105 has determined are experiencing a condition of zero-offset drift. In some embodiments, the computing device 105 can generate the updated zero-offset calibration coefficient responsive to determining the difference between the first ambient pressure measurement and the second ambient pressure measurement has exceeded a pre-determined threshold value.

In operation 250, the computing device 105 transmits the updated zero-offset calibration coefficient to the first pressure sensor 120. In some embodiments, the updated zero-offset calibration coefficient can be transmitted via wired or wireless connections between the computing device 105 and the sensors 120. For example, in some embodiments, such as those including a wired configuration, the updated zero-offset calibration coefficient can be transmitted to the sensors 120 via an inter-integrated circuit (I2C) serial communication protocol. In some embodiments, such as those including a wireless configuration, the updated zero-offset calibration coefficient can be transmitted to the sensors 120 via a Bluetooth low-energy communication protocol. In some embodiments, such as configurations including analog sensors 120, an analog interface can be included in the system 100 to offset the analog output by the required amount in order to correct for the zero drift.

In operation 260, the sensor 120 can update or overwrite a previously determined zero-offset calibration coefficient with the updated zero-offset calibration that was transmitted in operation 250. Upon receiving the updated zero-offset calibration coefficient, the sensor 120 can execute instructions causing the zero-offset calibration coefficient stored in EEPROM on the sensor 120 to be updated or overwritten with the updated zero-offset calibration coefficient received from the computing device 105. In this way, the sensor 120 can be automatically corrected for zero-drift.

In some embodiments, the operations of method 200 can be executed by the computing device 105 based on a pre-determine start time, a pre-determined event, or at a pre-determined interval of time since the instructions were previously executed. In this way, the sensor reset system 100 can automatically perform the zero-reset operations without manual intervention or inputs.

Figure 3:
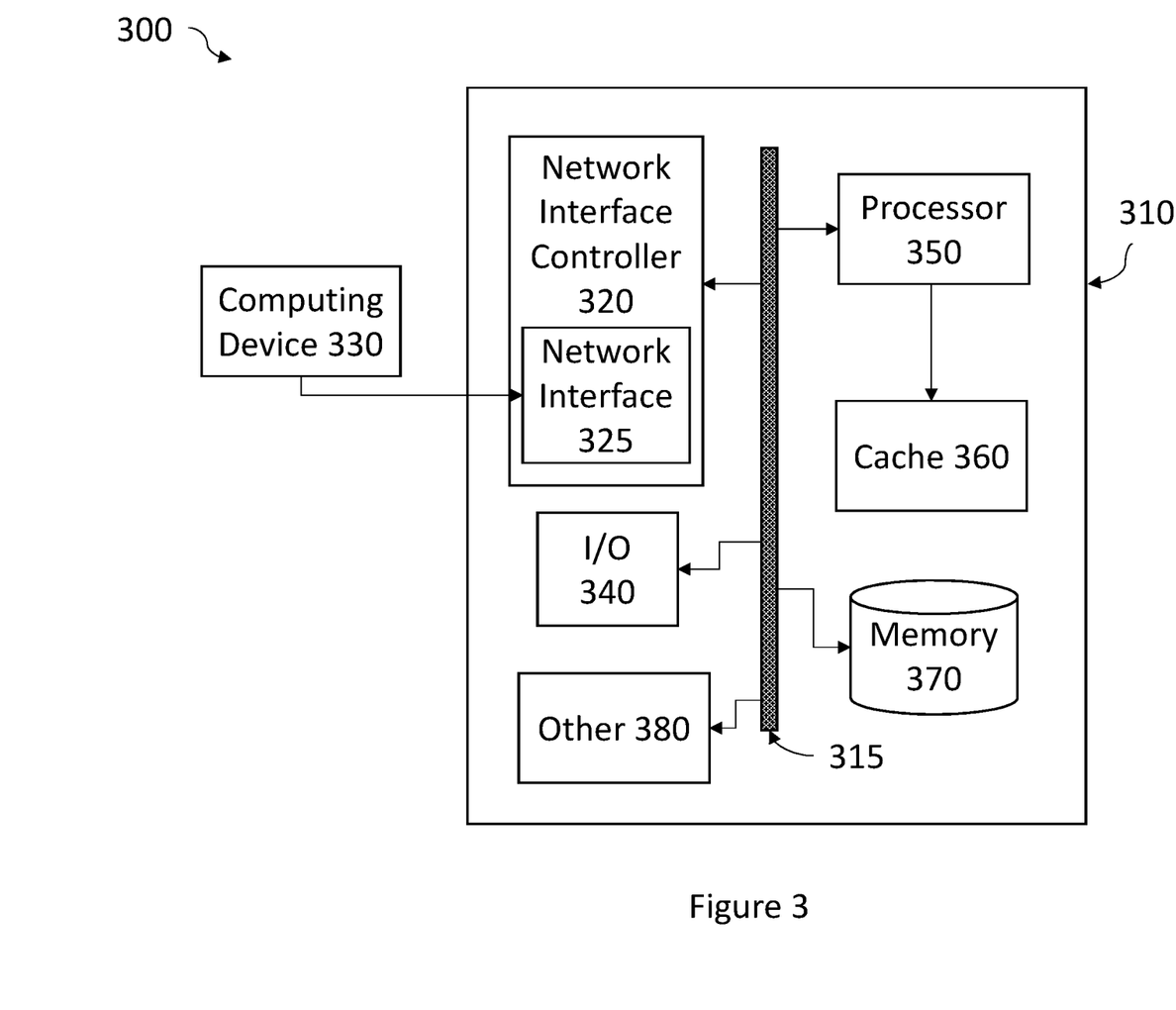
FIG. 3 is a block diagram of an exemplary computing system in accordance with an illustrative implementation of the sensor reset system of FIG. 1.

FIG. 3 is a block diagram 300 of a computing system 310 suitable for use in implementing the computerized components described herein. In broad overview, the computing system 310 includes at least one processor 350 for performing actions in accordance with instructions, and one or more memory devices 360 and/or 370 for storing instructions and data. The illustrated example computing system 310 includes one or more processors 350 in communication, via a bus 315, with memory 370 and with at least one network interface controller 320 with a network interface 325 for connecting to external devices 330, e.g., a computing device (such as sensor 120, sensor 130, a remotely located computing device 105, or a remotely located sensor reset system 100). The one or more processors 350 are also in communication, via the bus 315, with each other and with any I/O devices at one or more I/O interfaces 340, and any other devices 380. The processor 350 illustrated incorporates, or is directly connected to, cache memory 360. Generally, a processor will execute instructions received from memory. In some embodiments, the computing system 310 can be configured within a cloud computing environment, a virtual or containerized computing environment, and/or a web-based microservices environment.

In more detail, the processor 350 can be any logic circuitry that processes instructions, e.g., instructions fetched from the memory 370 or cache 360. In many embodiments, the processor 350 is an embedded processor, a microprocessor unit or special purpose processor. The computing system 310 can be based on any processor, e.g., suitable digital signal processor (DSP), or set of processors, capable of operating as described herein. In some embodiments, the processor 350 can be a single core or multi-core processor. In some embodiments, the processor 350 can be composed of multiple processors.

The memory 370 can be any device suitable for storing computer readable data. The memory 370 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 310 can have any number of memory devices 370.

The cache memory 360 is generally a form of high-speed computer memory placed in close proximity to the processor 350 for fast read/write times. In some implementations, the cache memory 360 is part of, or on the same chip as, the processor 350.

The network interface controller 320 manages data exchanges via the network interface 325. The network interface controller 320 handles the physical and data link layers of the Open Systems Interconnect (OSI) model for network communication. In some implementations, some of the network interface controller's tasks are handled by the processor 350. In some implementations, the network interface controller 320 is part of the processor 350. In some implementations, a computing device 310 has multiple network interface controllers 320. In some implementations, the network interface 325 is a connection point for a physical network link, e.g., an RJ 45 connector. In some implementations, the network interface controller 320 supports wireless network connections and an interface port 325 is a wireless receiver/transmitter. Generally, a computing device 310 exchanges data with other network devices 330, such as computing device 330, via physical or wireless links to a network interface 325. In some implementations, the network interface controller 320 implements a network protocol such as Ethernet, I2C, and/or Bluetooth low-energy protocols.

The other computing devices 330 are connected to the computing device 310 via a network interface port 325. The other computing device 330 can be a peer computing device, a network device, or any other computing device with network functionality. For example, a computing device 330 can be a sensor 120, a sensor 130, a computing device 105, a dedicated sensor calibration system including a sensor 130, and/or a sensor management system, which may be configured within the sensor reset system 100 illustrated in FIG. 1. In some embodiments, the computing device 330 can be a network device such as a hub, a bridge, a switch, or a router, connecting the computing device 310 to a data network such as the Internet.

In some uses, the I/O interface 340 supports an input device and/or an output device (not shown). In some uses, the input device and the output device are integrated into the same hardware, e.g., as in a touch screen. In some uses, such as in a server context, there is no I/O interface 340 or the I/O interface 340 is not used. In some uses, additional other components 380 are in communication with the computer system 310, e.g., external devices connected via a universal serial bus (USB).

The other devices 380 can include an I/O interface 340, external serial device ports, and any additional co-processors. For example, a computing system 310 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 310, e.g., a touch screen on a tablet device. In some implementations, a computing device 310 includes an additional device 380 such as a co-processor, e.g., a math co-processor that can assist the processor 350 with high precision or complex calculations.

Exemplary technical effects of the systems, devices, and methods described herein include, by way of non-limiting example, automatically performing a zero-reset operation of a pressure transducer using a sensor reset system as described herein. In one aspect, the sensor reset system can automatically determine an amount of zero drift based on comparing ambient pressure measurements from a first pressure sensor and a second pressure sensor. In another aspect, the sensor reset system can generate an updated zero-offset calibration coefficient for the first pressure sensor based on the ambient pressure measurement from the second pressure sensor. The sensor reset system can further transmit the updated zero-offset calibration coefficient to the first sensor where, once received, the first sensor can over-write a previously determined zero-offset calibration coefficient stored in memory of the first sensor with the updated zero-offset calibration coefficient. In this manner, the sensor reset system can automatically determine and update the zero-offset calibration coefficient so that ambient and non-ambient pressure measurements generated by the first sensors are consistently accurate of time.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A system comprising:
   a first pressure sensor configured to output a first ambient pressure measurement determined based on a zero-offset calibration coefficient previously determined for the first pressure sensor;
   a second pressure sensor configured to output a second ambient pressure measurement; and
   a computing device, including a processor, and a memory, the computing device coupled to the first pressure sensor and the second pressure sensor, wherein the processor is configured to execute computer-readable, executable instructions, stored in the memory, which when executed cause the processor to perform operations, including,
      receiving the first ambient pressure measurement from the first pressure sensor and the second ambient pressure measurement from the second pressure sensor,
      determining a difference between the first ambient pressure measurement and the second ambient pressure measurement,
      generating an updated zero-offset calibration coefficient, the generating responsive to determining the difference between the first ambient pressure measurement and the second ambient pressure measurement, and
      transmitting the updated zero-offset calibration coefficient to the first pressure sensor, wherein, when received, causes the first pressure sensor to update the previously determined zero-offset calibration coefficient with the updated zero-offset calibration coefficient.

2. The system of claim 1, wherein the first sensor comprises a piezo-resistive pressure transducer.

3. The system of claim 1, wherein the second sensor comprises a micro-electro-mechanical resonant pressure transducer.

4. The system of claim 1, wherein the second sensor is a trench etched resonant pressure sensor.

5. The system of claim 1, wherein the first pressure sensor is coupled to a machinery component and is configured to output a pressure measurement associated with the machinery component, the machinery component including a component of an aircraft system, a hydraulic system, a gas distribution system, and a fluid distribution system.

6. The system of claim 5, wherein the pressure measurement output by the first sensor is associated with a liquid.

7. The system of claim 5, wherein the pressure measurement output by the first sensor is associated with a gas.

8. The system of claim 1, wherein the computing device is configured to execute the instructions based on a pre-determined start time, a pre-determined event, or a pre-determined interval of time since the instructions were previously executed.

9. The system of claim 1, wherein the computing device is configured to generate the updated zero-offset calibration coefficient responsive to determining the difference between the first ambient pressure measurement and the second ambient pressure measurement has exceeded a pre-determined threshold value.

10. The system of claim 1, wherein the first ambient pressure measurement and the second ambient pressure measurement are measurements of a pressure of a surrounding medium exerted on the first pressure sensor and the second pressure sensor, respectively.

11. A method comprising:
receiving, by a computing device including a processor, a first ambient pressure measurement from a first pressure sensor, the first ambient pressure measurement determined based on a zero-offset calibration coefficient previously determined for the first pressure sensor;
receiving, by the computing device, a second ambient pressure measurement from a second pressure sensor;
determining, by the computing device, a difference between the first ambient pressure measurement and the second ambient pressure measurement;
generating, by the computing device, an updated zero-offset calibration coefficient, the generating responsive to determining the difference between the first ambient pressure measurement and the second ambient pressure measurement; and
transmitting, by the computing device, the updated zero-offset calibration coefficient to the first pressure sensor, wherein, when received, causes the first pressure sensor to update the previously determined zero-offset calibration coefficient with the updated zero-offset calibration coefficient.

12. The method of claim 11, wherein the first sensor comprises a piezo-resistive pressure transducer.

13. The method of claim 11, wherein the second sensor comprises a micro-electro-mechanical resonant pressure transducer.

14. The method of claim 11, wherein the second sensor is a trench etched resonant pressure sensor.

15. The method of claim 11, wherein the first pressure sensor is coupled to a machinery component and is configured to output a pressure measurement associated with the machinery component, the machinery component including a component of an aircraft system, a hydraulic system, a gas distribution system, and a fluid distribution system.

16. The method of claim 15, wherein the pressure measurement output by the first sensor is associated with a liquid.

17. The method of claim 15, wherein the pressure measurement output by the first sensor is associated with a gas.

18. The method of claim 11, wherein the computing device is configured to execute the instructions based on a pre-determined start time, a pre-determined event, or a pre-determined interval of time since the instructions were previously executed.

19. The method of claim 11, wherein the first ambient pressure measurement and the second ambient pressure measurement are measurements of a pressure of a surrounding medium exerted on the first pressure sensor and the second pressure sensor, respectively.

20. A machine readable storage medium containing program instructions, which when executed cause one or more processors to perform the method of:
receiving, by a computing device including a processor, a first ambient pressure measurement from a first pressure sensor, the first ambient pressure measurement determined based on a zero-offset calibration coefficient previously determined for the first pressure sensor;
receiving, by the computing device, a second ambient pressure measurement from a second pressure sensor;
determining, by the computing device, a difference between the first ambient pressure measurement and the second ambient pressure measurement;
generating, by the computing device, an updated zero-offset calibration coefficient, the generating responsive to determining the difference between the first ambient pressure measurement and the second ambient pressure measurement; and
transmitting, by the computing device, the updated zero-offset calibration coefficient to the first pressure sensor, wherein, when received, causes the first pressure sensor to update the previously determined zero-offset calibration coefficient with the updated zero-offset calibration coefficient.

* * * * *